US012592254B2

(12) United States Patent
Nave

(10) Patent No.: US 12,592,254 B2
(45) Date of Patent: Mar. 31, 2026

(54) REMOVABLE ROBOT FOR AUTOMATED DATA STORAGE LIBRARY

(71) Applicant: International Business Machines Corporation, Armonk, NY (US)

(72) Inventor: Shawn M. Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 691 days.

(21) Appl. No.: 17/940,335

(22) Filed: Sep. 8, 2022

(65) Prior Publication Data

US 2024/0087613 A1     Mar. 14, 2024

(51) Int. Cl.
| | |
|---|---|
| *G11B 15/68* | (2006.01) |
| *G11B 17/22* | (2006.01) |
| *G11B 33/04* | (2006.01) |
| *G11B 33/12* | (2006.01) |

(52) U.S. Cl.
CPC ........ *G11B 15/6835* (2013.01); *G11B 15/681* (2013.01); *G11B 15/6815* (2013.01); *G11B 17/225* (2013.01); *G11B 33/0461* (2013.01); *G11B 33/128* (2013.01)

(58) Field of Classification Search
None
See application file for complete search history.

(56) References Cited

U.S. PATENT DOCUMENTS

| | | | | |
|---|---|---|---|---|
| 6,386,116 | B1 | 5/2002 | Ostwald | |
| 6,473,371 | B1 | 10/2002 | White | |
| 6,798,612 | B2 * | 9/2004 | Smith et al. ....... | G11B 15/6835 |
| | | | | 360/92.1 |
| 7,102,848 | B2 | 9/2006 | Kumpon et al. | |
| 7,119,982 | B2 | 10/2006 | Starr et al. | |
| 7,184,242 | B1 | 2/2007 | Ostwald et al. | |
| 7,450,330 | B2 | 11/2008 | Sasaki | |
| 8,873,360 | B2 * | 10/2014 | Minemura ......... | G11B 15/6835 |
| | | | | 369/75.11 |
| 11,342,004 | B2 | 5/2022 | Todd | |

OTHER PUBLICATIONS

Sun Microsystems, "StorageTek StreamLine SL8500 Modular Library System," Replaceable Parts Catalog, PN 96139, Revision F, Jul. 2007. 354 pages.
Oracle, "StorageTek SL8500 Modular Library System," Oracle Data Sheet, 2015, 5 pages.

* cited by examiner

*Primary Examiner* — Craig A. Renner
(74) *Attorney, Agent, or Firm* — Zilka-Kotab, P.C.

(57) ABSTRACT

In one general embodiment, an apparatus includes a guidance system configured for coupling to a frame of an automated data storage library, the guidance system including a guide member coupled to a rail and configured to move along the rail in a first direction. A robot is detachably coupled to the guidance system and physically configured to be moved out of the automated data storage library in a direction about perpendicular to a plane of intended movement directions of the robot. The guidance system is configured such that the guide member remains engaged with the rail upon detachment of the robot therefrom.

20 Claims, 17 Drawing Sheets

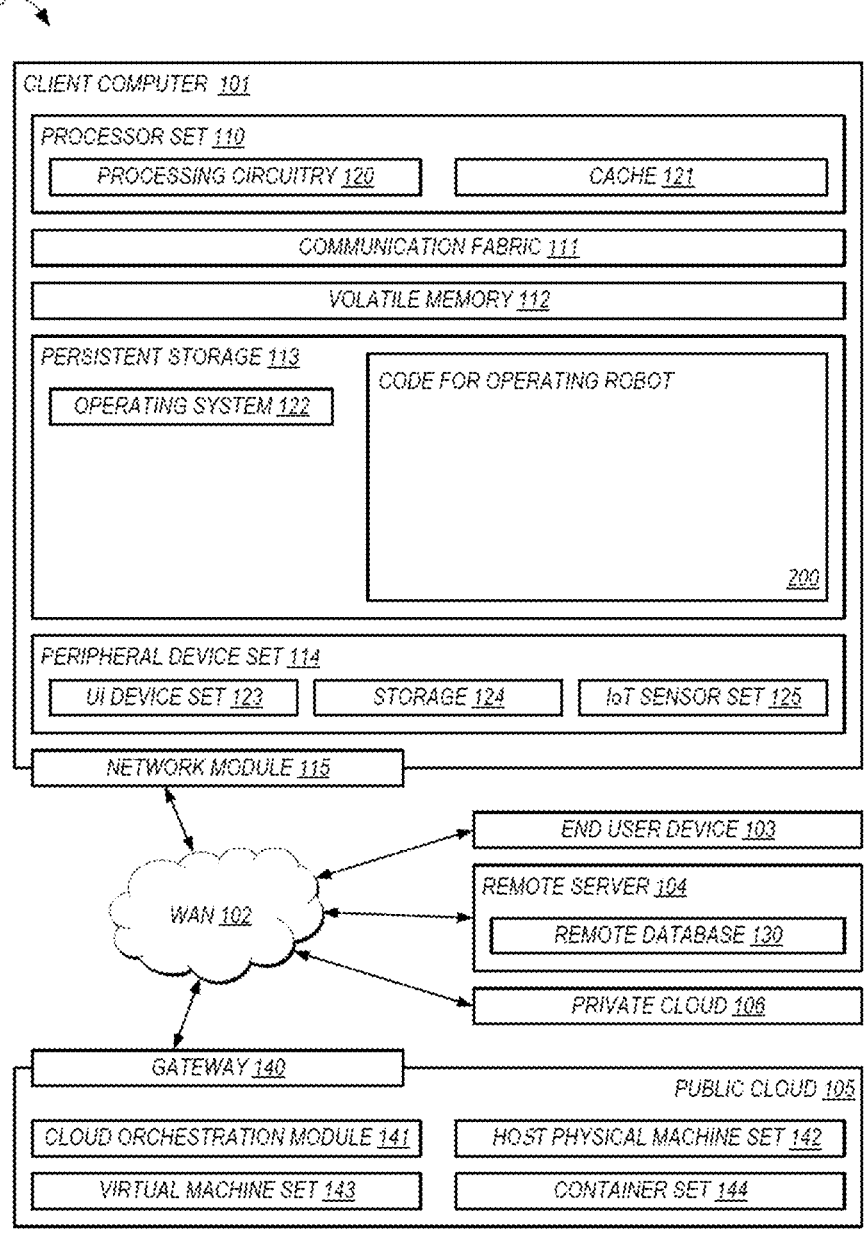

*100*

CLIENT COMPUTER  *101*

PROCESSOR SET *110*

PROCESSING CIRCUITRY *120*      CACHE *121*

COMMUNICATION FABRIC *111*

VOLATILE MEMORY *112*

PERSISTENT STORAGE *113*

OPERATING SYSTEM *122*

CODE FOR OPERATING ROBOT

*200*

PERIPHERAL DEVICE SET *114*

UI DEVICE SET *123*      STORAGE *124*      IoT SENSOR SET *125*

NETWORK MODULE *115*

WAN *102*

END USER DEVICE *103*

REMOTE SERVER *104*

REMOTE DATABASE *130*

PRIVATE CLOUD *106*

GATEWAY *140*

PUBLIC CLOUD *105*

CLOUD ORCHESTRATION MODULE *141*      HOST PHYSICAL MACHINE SET *142*

VIRTUAL MACHINE SET *143*      CONTAINER SET *144*

*FIG. 1*

REMOVABLE ROBOT FOR AUTOMATED DATA STORAGE LIBRARY

BACKGROUND

The present invention relates to data storage systems, and more particularly, this invention relates to an easily-removable robot for an automated data storage library.

Automated data storage libraries are known for providing cost effective storage and retrieval of large quantities of data. The data in automated data storage libraries is typically stored on media of data storage cartridges that are, in turn, stored in storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick®, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more robots (also known as accessors). Such robots may have grippers for physically retrieving the selected data storage cartridges from the storage slots within the automated data storage library and transporting such cartridges to the data storage drives by moving, for example, in the horizontal (X) and vertical (Y) directions.

The robots in these types of storage systems are typically guided by rail systems which allow the robot to move vertically and/or horizontally in a linear library, such as the IBM TS4500 tape library or Spectra® T-Finity® tape library, or in a circular and vertical motion in a cylindrical library such as the older Oracle/StorageTek Powderhorn® tape library. Mechanisms that allow for robot motion include belt drive systems, rack and pinion drive systems, pulley systems, etc. All of these types of libraries have a guide rail that guides the robot accurately within the library while the propulsion of the robot is performed by the above-mentioned mechanisms. Due to the precision required for the robot to accurately pick and place the storage media, it is important that the robot is tightly controlled within, and constrained to, the guidance system. Since the robots are complex mechanisms, eventually and inevitably there are components within the robots that fail, which in turn creates a need for either repair or replacement of the robot. Various methods are used for robot repair and replacement, with some drawbacks.

Existing products that have large robots sometimes address component failures by replacing just the failed component on the robot, e.g., a specific motor. The drawback with this repair reproach is that the robots can be very complex and have many parts that could possibly fail. Failure isolation can be very difficult, and often many parts of a robot end up getting replaced before the problem is resolved. This creates another drawback in that many replacement parts have to be stocked, and often the component replacement is difficult and requires specialized training for repair technicians. Many customers of tape libraries would prefer to have self-service of robotic components and strongly desire to have untrained technicians perform component repairs, such as the robot repairs.

Other existing products do perform entire robot replacements. Smaller rack mount libraries have entire robot replacements which require entire rack mount drawers to be removed from a base rack. However, it is difficult and disruptive to remove an entire module of a storage library from a rack to perform this robot removal.

Another solution that is common for robot removal for larger storage libraries is to open up a side door on the library and allow the robot to slide horizontally out of the library, off of the guidance rails. Examples of systems that allow this approach include the IBM TS4500 tape library or the Spectra® T-Finity® tape library. A disadvantage of this solution is that side clearance for the library is required. When space in a customer's datacenter is expensive and at a premium, requiring this extra "wasted" space next to the library for service clearance for robot replacement is not desirable.

Other solutions are to have a complex mechanism or wheel clamp that disengages the robot from the guidance system. An example of this type of mechanism can be seen in the Oracle/StorageTek SL8500 tape library where handbots can be disengaged from their guidance rail with a toggle clamp mechanism. This type of mechanism can be difficult and expensive to implement. Training of personnel may also be required to perform the complex task of removing the robot from the library. Also, the complexity of this type of mechanism is another point of potential failure with risk of error in installation.

SUMMARY

An apparatus, in accordance with one embodiment, includes a guidance system configured for coupling to a frame of an automated data storage library, the guidance system including a guide member coupled to a rail and configured to move along the rail in a first direction. A robot is detachably coupled to the guidance system and physically configured to be moved out of the automated data storage library in a direction about perpendicular to a plane of intended movement directions of the robot. The guidance system is configured such that the guide member remains engaged with the rail upon detachment of the robot therefrom.

A method for removing a robot from an automated data storage library, in accordance with one embodiment, includes decoupling a robot from guide members of a guidance system mounted in a frame of the automated data storage library. The robot is moved out of the automated data storage library in a direction perpendicular to a plane of movement of the robot within the automated data storage library, whereby the guide members remain engaged with rails of the guidance system upon removal of the robot.

Any of these embodiments may be implemented in a magnetic data storage system such as a tape library system, which may include tape drives, storage slots, the robot, etc.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

DETAILED DESCRIPTION

Figure 2:
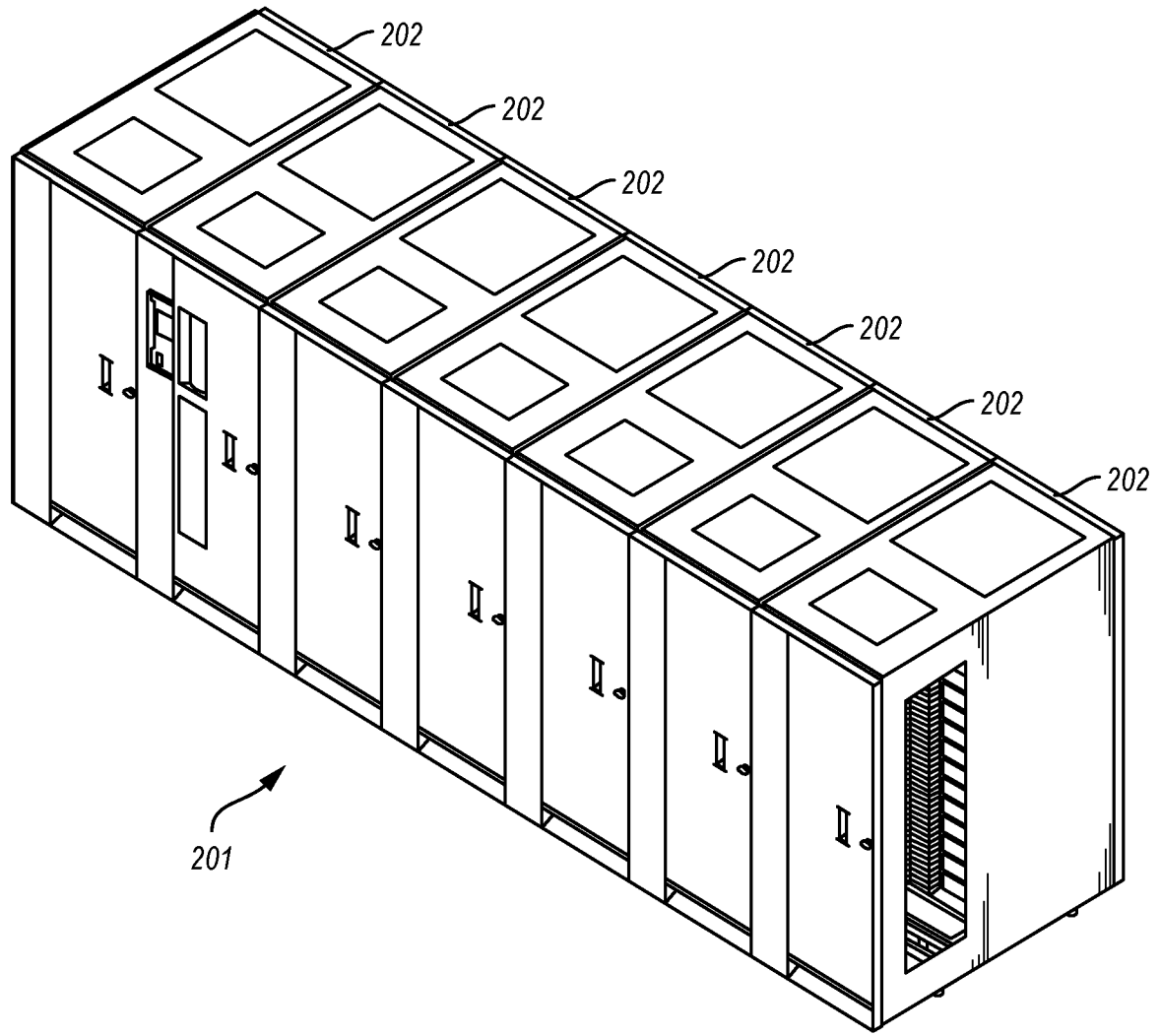
FIG. 2 is a perspective view of an automated data storage library according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of components for automated data storage libraries. Particularly, a removable robot for an automated data storage library is described, as well as a process for removing the same. The robot, in preferred embodiments, is designed for easy replacement. For example, the design of the robot in preferred embodiments is such that the parts of the robot that are attached to the guidance system (e.g., the guide members that move along a rail) can be separate from the robot, such that when the robot is removed from the automated data storage library, the guide members, which themselves have an extremely low failure rate, stay in the storage library while the robot is removed. Thus, entire robotic mechanisms be replaced in order to quickly return the storage device to an operational state.

In one general embodiment, an apparatus includes a guidance system configured for coupling to a frame of an automated data storage library, the guidance system including a guide member coupled to a rail and configured to move along the rail in a first direction. A robot is detachably coupled to the guidance system and physically configured to be moved out of the automated data storage library in a direction about perpendicular to a plane of intended movement directions of the robot. The guidance system is configured such that the guide member remains engaged with the rail upon detachment of the robot therefrom.

In another general embodiment, a method for removing a robot from an automated data storage library includes decoupling a robot from guide members of a guidance system mounted in a frame of the automated data storage library. The robot is moved out of the automated data storage library in a direction perpendicular to a plane of movement of the robot within the automated data storage library, whereby the guide members remain engaged with rails of the guidance system upon removal of the robot.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Computing environment 100 contains an example of an environment for the execution of at least some of the computer code involved in performing the inventive methods, such as code 200 for operating a robot of an automated data storage library. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network, or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 3:
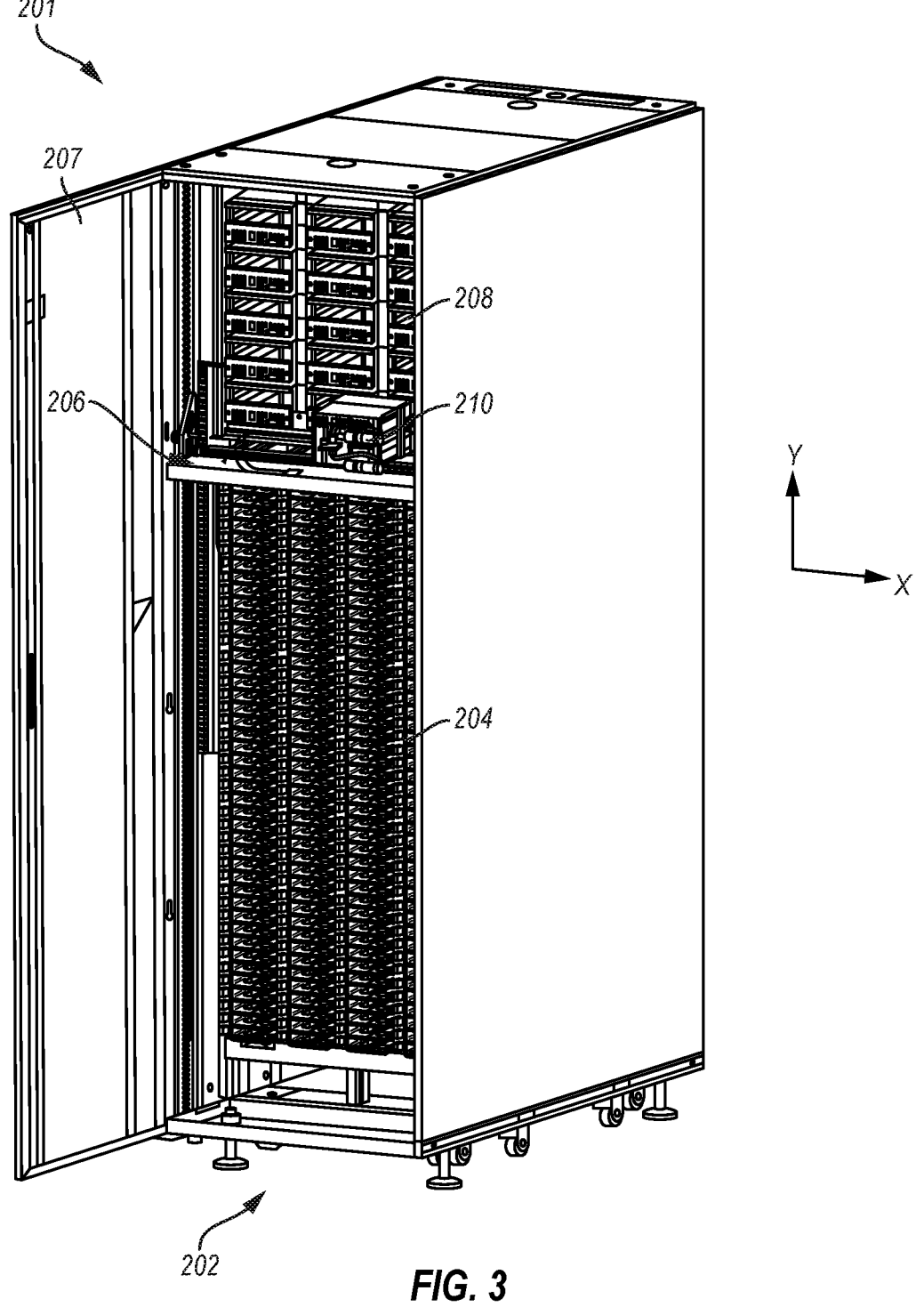
FIG. 3 is a perspective view of a storage frame from the data storage library of FIG. 2.

FIGS. 2-3 illustrate an automated data storage library 201 which stores and retrieves data storage cartridges, containing data storage media (not shown), e.g., from multi-cartridge deep slot cells 204 or other storage cells. An example of an automated data storage library which has a similar configuration as that depicted in FIGS. 2-3, and may be implemented with some of the various approaches herein is the IBM® 3584 UltraScalable Tape Library (IBM and all IBM—based trademarks and logos are trademarks or registered trademarks of International Business Machines Corporation and/or its affiliates). Moreover, it should be noted that references to "data storage media" herein refer to data storage cartridges, and for purposes of the present application, the two terms may be used synonymously.

The library 201 of FIG. 2 comprises a plurality of storage frames 202, though some embodiments may have only a single storage frame 202. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, robots, operator panels, etc.

FIG. 3 shows an exemplary embodiment of a storage frame 202, which acts as the base frame of the library 201. Moreover, the storage frame 202 illustrated in FIG. 3 is contemplated to be a minimum configuration of the library 201, for which there is only a single robot 206 (i.e., there are no redundant robots) and no service bay. However, in other embodiments, a storage frame may include multiple robotic robots and/or service bays.

Looking to FIG. 3, the library 201 is arranged for accessing data storage media in response to commands from at least one external host system (not shown). The library 201 includes a plurality of features for holding media cartridges. The library 201 show includes a plurality of multi-cartridge deep slot cells 204, which may be used for storing data storage cartridges that may contain data storage media. According to one approach, the multi-cartridge deep slot cells 204 are configured to store a plurality of data storage cartridges. In a preferred approach, the multi-cartridge deep slot cells may be arranged in sequential order of tiers from front to rear (e.g., see FIG. 9A). In other approaches, single cartridge cells (not shown) are also and/or alternatively present in the library 201.

With continued reference to FIG. 3, the storage frame 202 of the library 201 also includes at least one data storage drive 208, e.g., for reading and/or writing data with respect to the data storage media. Additionally, a robot 206 may be used to transport data storage media between the multi-cartridge deep slot cells 204 and/or the data storage drive(s) 208. According to various approaches, the data storage drives 208 may be optical disc drives, magnetic tape drives, solid state drives having nonvolatile random access memory (NVRAM) such as Flash memory, or other types of data storage drives as are used to read and/or write data with respect to the data storage media.

The storage frame 202 may optionally include an operator panel or other user interface, such as a web-based interface, which allows a user to interact with the library 201.

In various embodiments, the storage frames 202 may be configured with different components depending upon the intended function. One configuration of storage frame 202 may comprise multi-cartridge deep slot cells 204, data storage drive(s) 208, and other optional components to store and retrieve data from the data storage cartridges. However, in another approach, a storage frame 202 may include single-cartridge storage slots and/or multi-cartridge deep slot cells 204 and no other components. In a further approach, a storage frame 202 may include only data storage drives 208 but no cartridge storage slots or multi-cartridge deep slot cells 204.

The automated data storage library includes a robot 206 that accesses data storage cartridges. Particularly, the robot 206 shown moves in a horizontal (X) direction and vertical (Y) direction to move the storage cartridges between storage slots and storage read/write devices, e.g., drives 208.

The robot 206 is a relatively complex mechanism, and may have several motors, control electronics, one or more scanning devices (such as a bar code scanner, wireless interface, and/or other reading system), and picker mechanisms (referred to herein as a gripper assembly 210) for grabbing/placing data storage cartridges. The mechanism that allows the robot to move horizontally (in X) is part of this robot mechanism. All of these mechanisms in the robot are subject to failure over time, so at some point they may need to be replaced.

The storage library preferably has a front door 207 that can be opened to allow the operator access to the robot 206 for replacement.

FIGS. 4A-4G are detailed perspective views of the robot 206 of FIG. 3 and a guidance system 450 mounted in the frame 202 of FIG. 3. Except as otherwise described herein, the robot 206 may have conventional components adapted according to the teachings herein and operate to move media cartridges in a known manner.

The robot depicted in FIGS. 4A-4F is designed for easy replacement and/or repair. In particular, the design of this robot 206 is such that some components that are attached to, e.g., the inner walls of the frame 202, such as the guide members can be separated from the robot. Thus, when the robot is replaced, the guide members, which themselves have an extremely low failure rate, stay in the storage library while the robot is removed.

An advantage provided by this embodiment is that it enables very easy replacement of a robot. In most cases, an un-trained operator can perform the replacement action. Preferably, replacement is simple such that it does not require any special alignment of the guide members to the automated data storage library upon replacement, because the guide members never leave the library. This also allows robot replacement from the front of a library where no additional service clearance or removal of storage modules is required to replace the robot. In preferred embodiments, the robot is detachably coupled to the guidance system by only tool-less coupling mechanisms, thereby allowing removal and replacement without the need for a tool such as a screwdriver, wrench, etc.

Moreover, the fact that the guide members do not need to be removed from the automated data storage library when a robot is removed allows for tighter coupling of the guide members to the guide rail, and no complicated steps to realign the guide rail.

In addition, prior systems required a robot to move to a service bay for removal. However, if the robot were unable to move to the service bay location due to some robotic failure, the robot could not be replaced without disassembling part of the library. In sharp contrast, the robot shown in FIGS. 4A-4F is able to be replaced from nearly all positions within an automated data storage library.

Figure 4A:
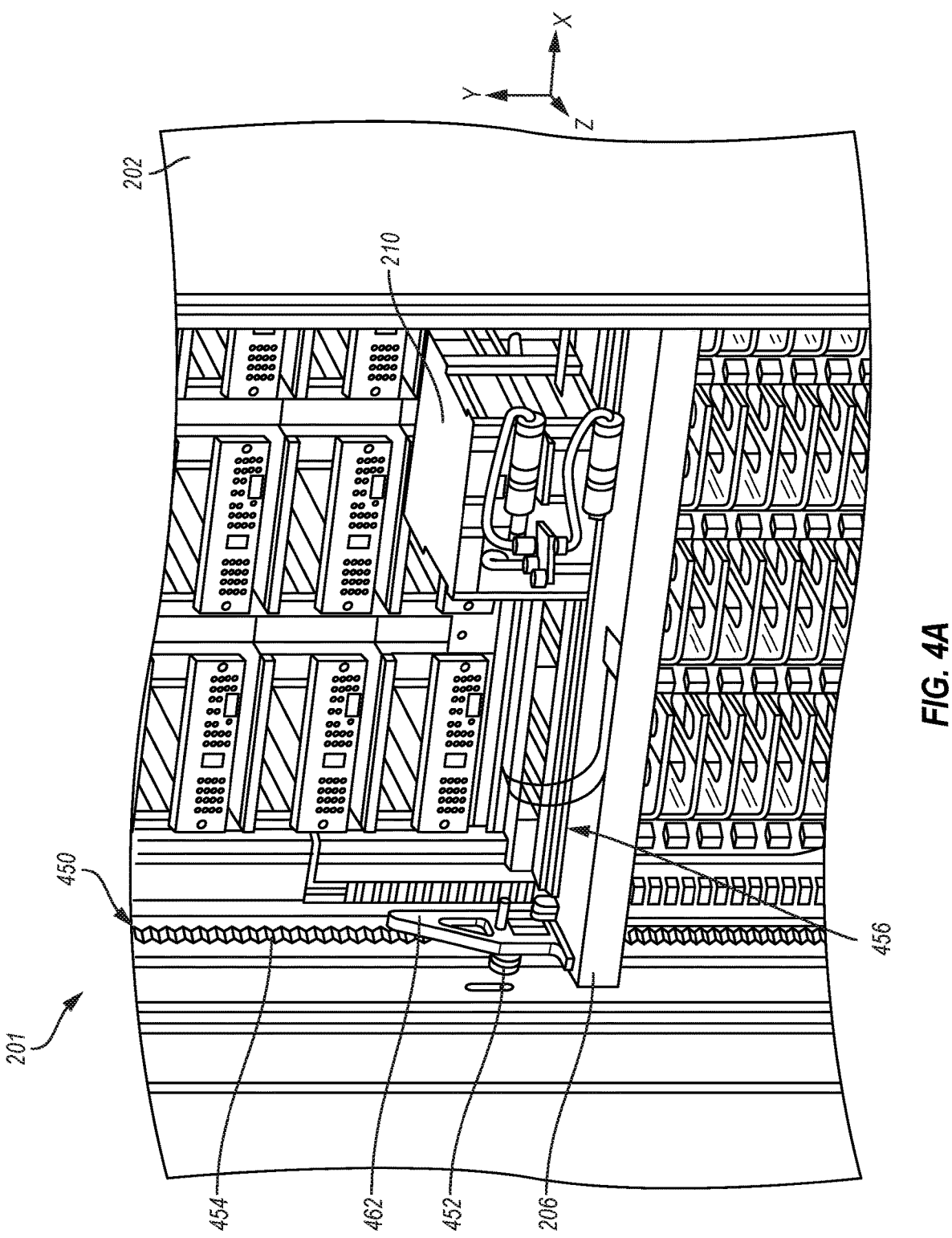
FIGS. 4A-4G are partial perspective views of a robot of the data storage library of FIG. 2.
Figure 4B:
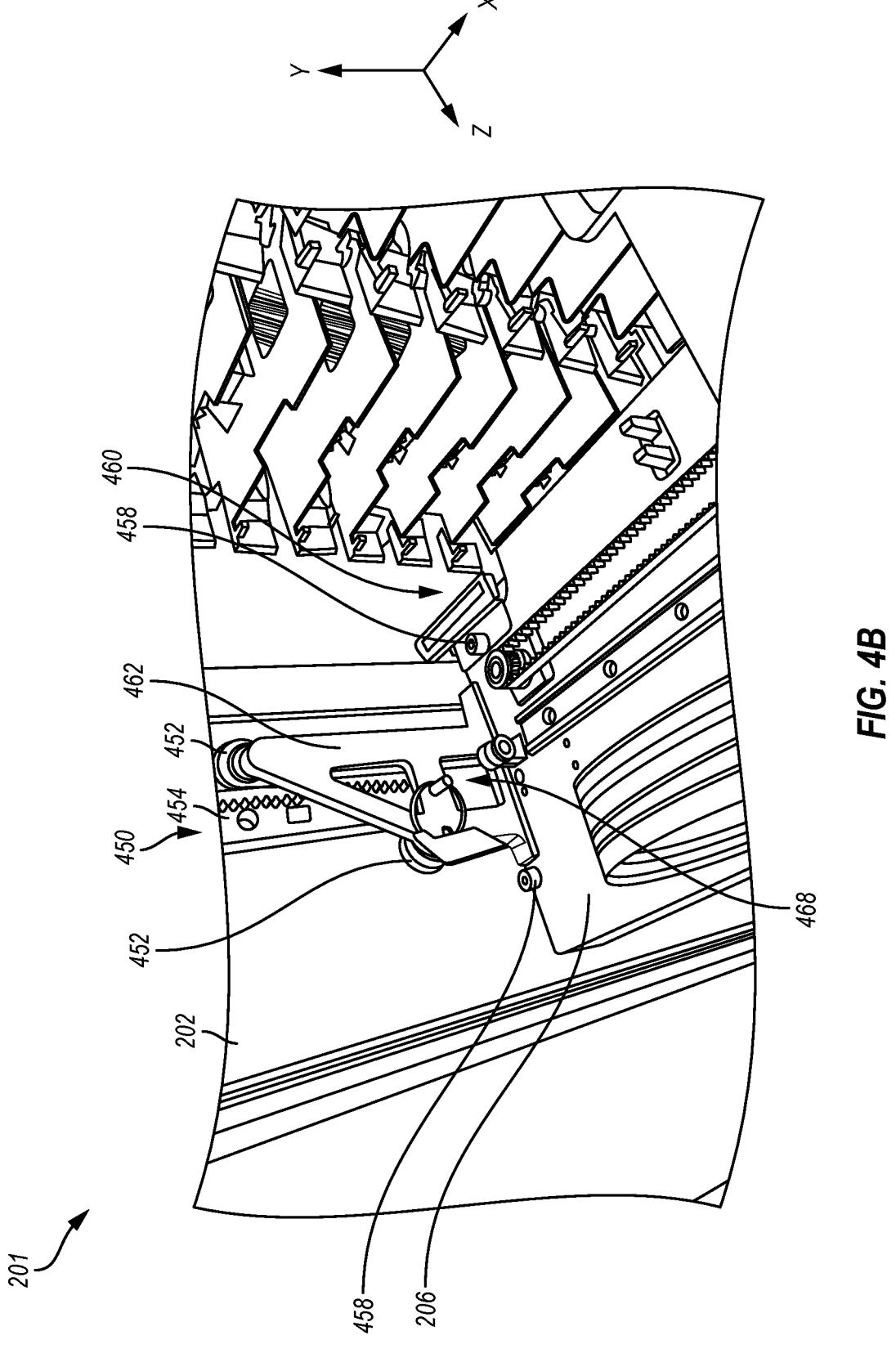
Figure 4C:
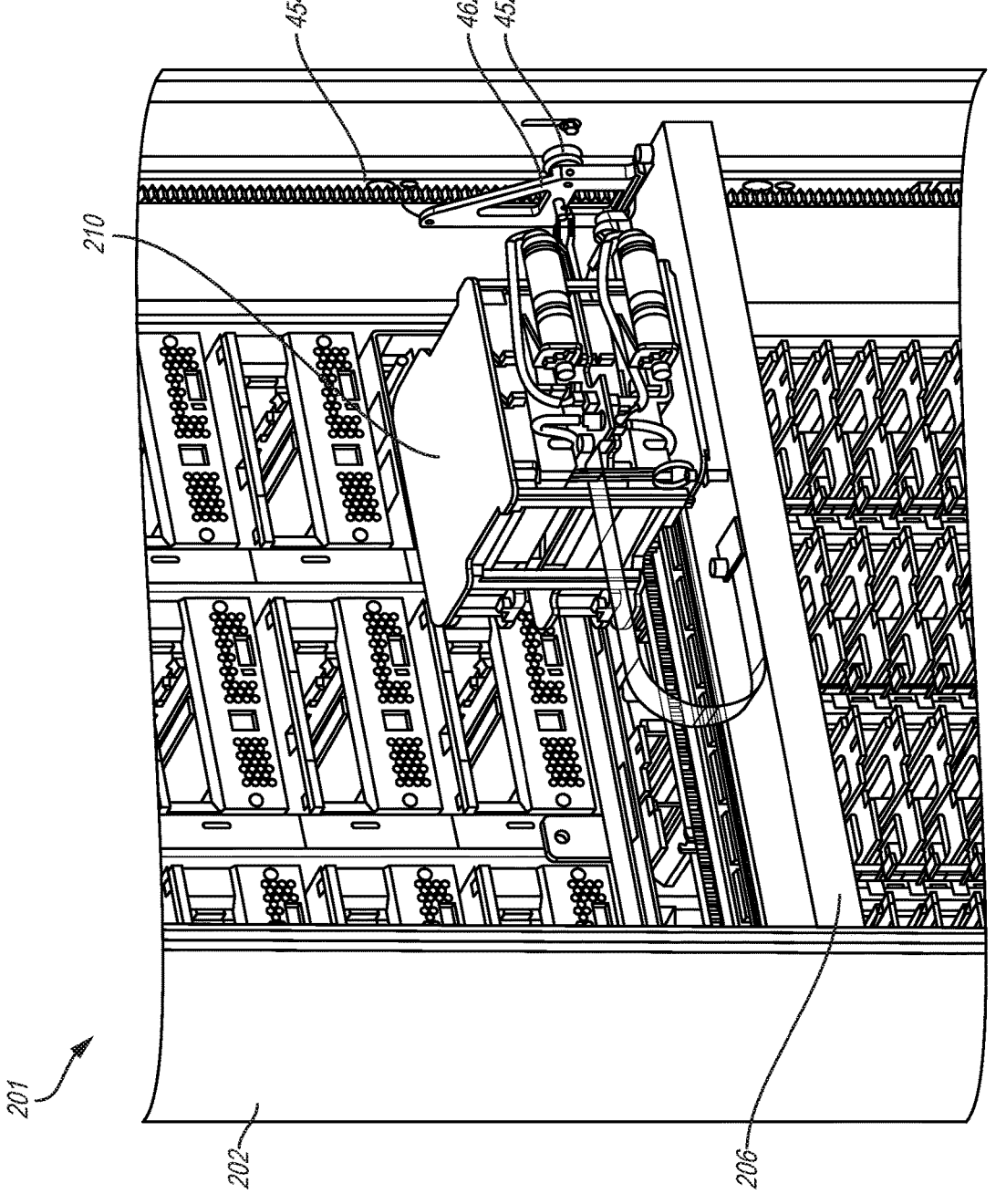

Referring to FIGS. 4A-4C, a guidance system 450 is configured for coupling to a frame 202 of the automated data storage library 201. The guidance system 450 includes several members 452 movably coupled to a rail 454 and configured to move along the rail 454 in a first direction, here a vertical (Y) direction. The rails 454 guide the robot as it moves vertically (in Y) through the storage library.

The guide members 452 may be any member that can move along a rail. As shown in FIG. 4A, the guide members 452 in this exemplary embodiment are wheels that move with the robot 206 and are precisely attached to the rails 454. In other approaches, the guide members 452 may include a linear guide, a linear bearing, etc. Some embodiments may employ a combination of different types of guide members 452 that work together to couple the robot to the rails 454.

In one exemplary approach, a rack may be molded into the rails 454 that allows a rack and pinion drive of the robot 206 to provide the vertical propulsion of the robot 206. Note, however, that other methods of propulsion may be used in other embodiments.

The robot is detachably coupled to the guidance system 450 and is physically configured to be moved out of the automated data storage library in a direction (Z) about perpendicular to a plane of intended XY movement directions of the robot. As will soon become apparent, the guidance system 450 is configured such that the guide members 452 remain engaged with the rail 454 upon detachment of the robot therefrom. See, e.g., FIGS. 4D-4E. Thus, the complex parts of the robot that have a higher failure rate can be easily replaced.

The robot may include a mechanism 456 for providing movement of a picker assembly 210 of the robot in a second direction, here a horizontal (X) direction. The mechanism 456, as well as the picker assembly, may be of any type that would become apparent to one skilled in the art after upon reading the present disclosure, e.g., may incorporate known components adapted for use in the present system. More than one picker assembly may be present. As shown, the robot includes two picker assemblies. Illustrative mechanisms 456 for providing movement may include a belt drive, a lead screw, rack & pinion drive, linear actuator, etc.

The dimensions of the robot are preferably such that the robot can be readily removed from the front of the frame 202, e.g., through the front door. In the example shown, the width of the robot along the X direction is less than the distance between opposing rails 454 of the guidance system 450 as measured in the same direction. This provides an advantage in that the robot 206 without the guide members 452 is smaller in size than the robot 206 with the guide members 452 attached. This narrower robot allows the robot to more easily fit through the open storage library door 207 while maximizing the horizontal travel distance that the robot can achieve.

While FIGS. 4A-4C depict a guidance system 450 that facilitates movement of the robot vertically, in other embodiments, the guidance system 450 may be oriented to move the robot along the X direction, and the picker mechanism of the robot would move along the Y direction. In such case, the guidance system 450 may extend horizontally across multiple frames 202 of the automated data storage library, thereby allowing the robot to service multiple frames 202 by traversing holes in the walls of adjacent frames 202.

To enable easy removal of the robot, the robot is preferably detachably coupled to the guidance system 450 by only tool-less coupling mechanisms 458. Any tool-less coupling mechanism 458 that would become apparent to one skilled in the art upon reading the present disclosure may be used. Exemplary tool-less coupling mechanisms include thumb screws, compression fittings, pins, etc. Referring to FIG. 4B, a thumb screw is shown coupling the robot to the guidance system 450.

Also shown in FIG. 4B is a tool-less coupling mechanism 458 coupling a cable 460 to the robot. The cable 460 is configured for tool-less coupling and decoupling from the robot. Any type of cable coupling mechanism that would become apparent to one skilled in the art upon reading the present disclosure may be used.

In some approaches, no cable extends between the frame and the robot. Rather, other mechanisms to provide power and control signals to the robot can be used. For example, a bus bar may extend along one or both of the rails 454 for providing power and/or control signals to the robot. The robot may then include a brush for contacting the bus bar. Multiple bus bars may be present, e.g., a hot bus bar, a ground bus bar, a control signal bus bar, etc. and a corresponding number of brushes. This may obviate the need for a power and/or control cable to the robot. The robot may be controlled wirelessly, e.g., via WiFi, Bluetooth, etc.

The guidance system 450 itself may have any desired configuration that would become apparent to one skilled in the art upon reading the present disclosure. In the approach shown, opposing rails 454 are positioned toward opposite sides of the robot. Guide members 452 are coupled to the rails 454, and mounts 462 are coupled to the guide members 452.

The rails 454 may have features of any type, e.g., a flat surface, a rounded surface, a channel, a groove, etc. Likewise, the guide members 452 may have any desired configuration, e.g., of conventional design.

In equivalent approaches, the guidance system 450 may include a tongue and groove configuration, with or without a guide member.

The mounts 462 preferably have an engagement feature 464 for engaging a cooperating feature 466 of the robot. In the approach shown in FIGS. 4F-4G, the engagement feature 464 of each mount 462 is a slot for slidably receiving the cooperating feature 466 of the robot therein.

Also preferably, each mount 462 includes a retaining feature 468 for selectively coupling the mounts 462 to the rails 454 for preventing movement of the mounts 462 relative to the rails 454. Any type of retaining feature that would become apparent to one skilled in the art upon reading the present disclosure may be used. In one approach, as shown in FIG. 4B, the retaining feature 468 is a pair of holes. A pin may be inserted through a hole in the mount 462 and into a hole in the frame or rail 454. In another approach, a pin may be inserted through a hole in the guide member 452 to prevent its rotation. In yet another approach, a brake may engage one of the guide members 452, the mount 462, etc. The retaining feature 468 used in some approaches provides the benefit of preventing the mounts 462 from becoming misaligned with each other along the first direction when removing or installing the robot. Otherwise, it is possible that tilting of the robot could occur, making removal and/or installation difficult, as well as potentially causing damage to the robot 206 and/or mounts 462.

Figure 4D:
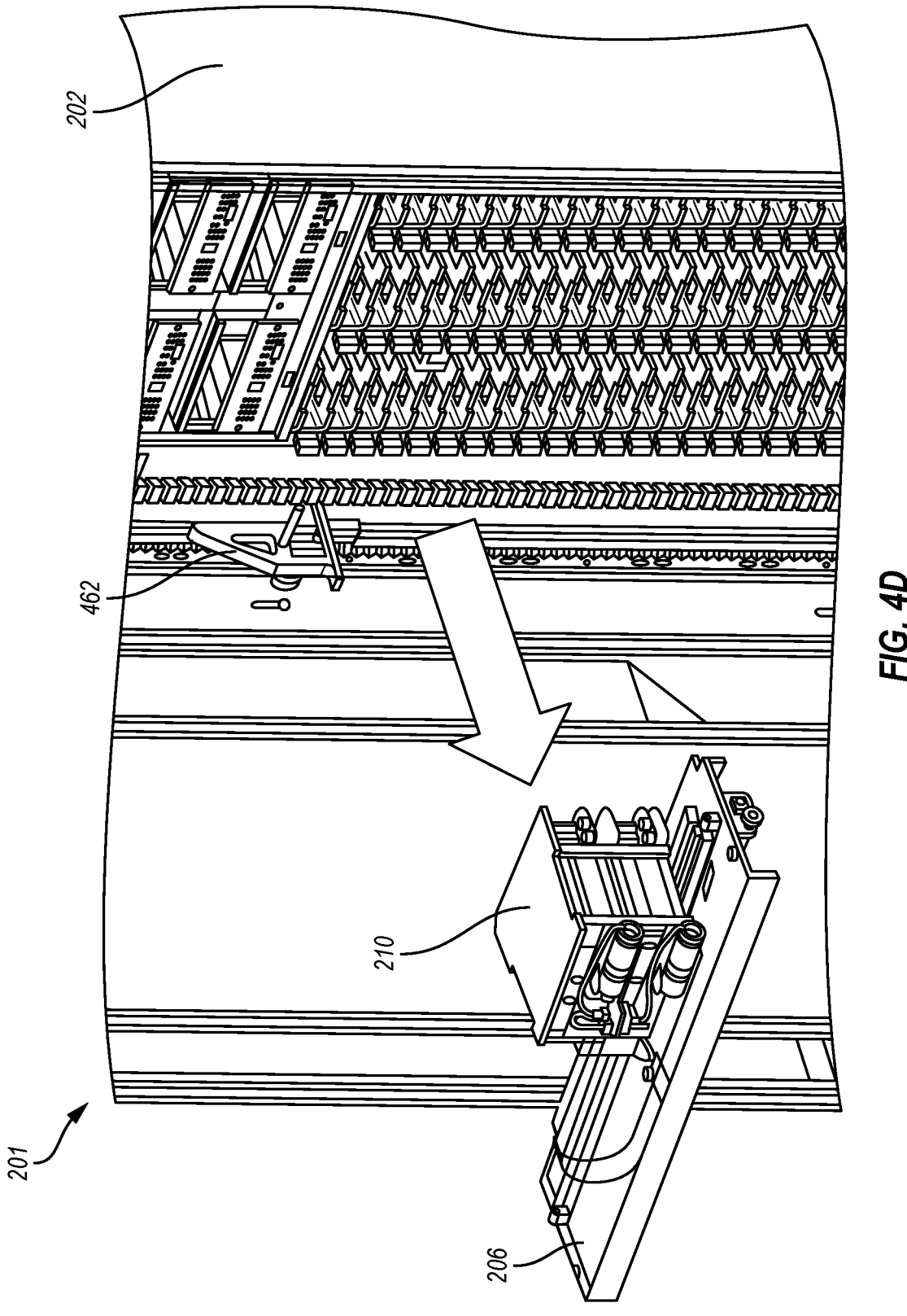
Figure 4E:
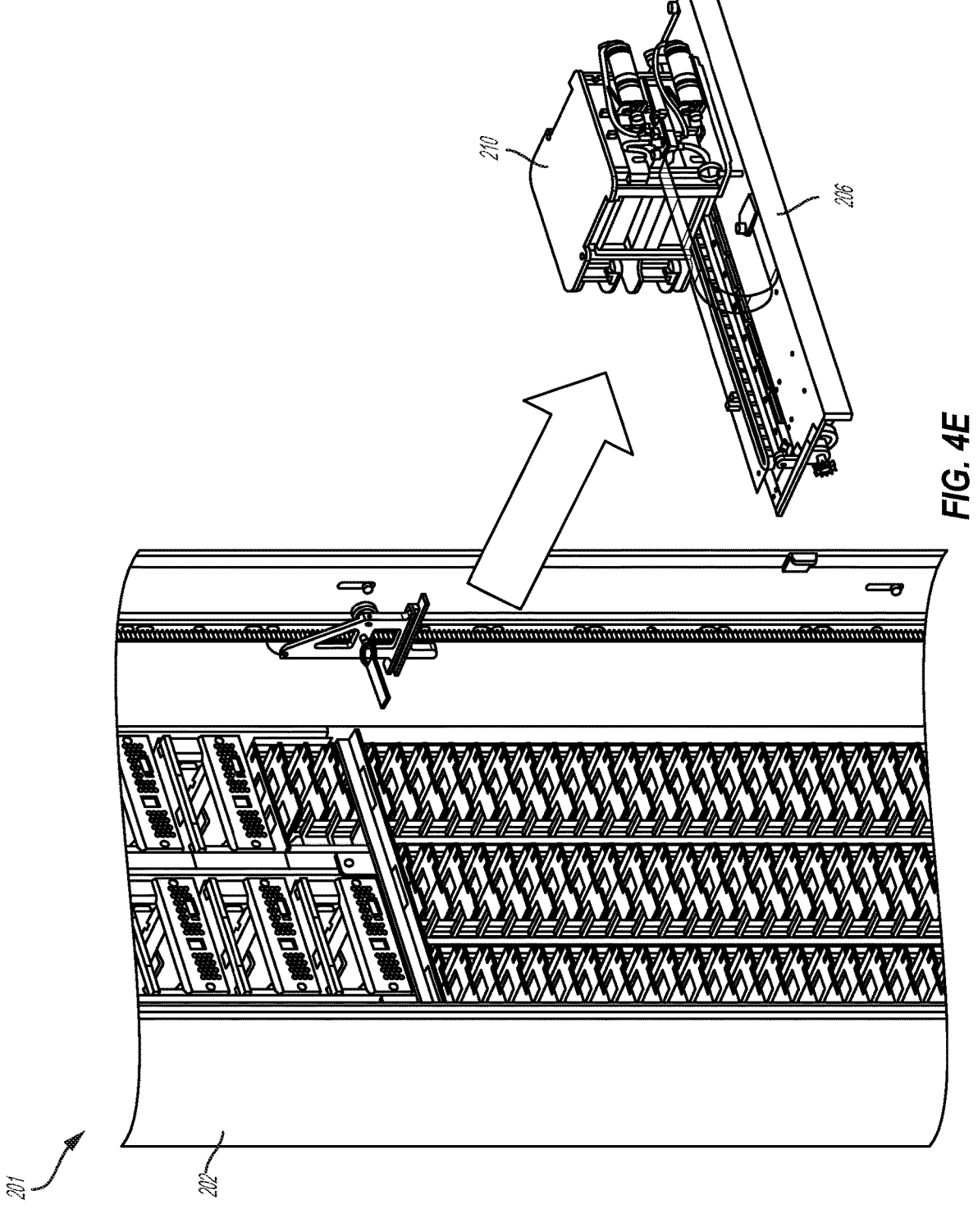
Figure 4F:
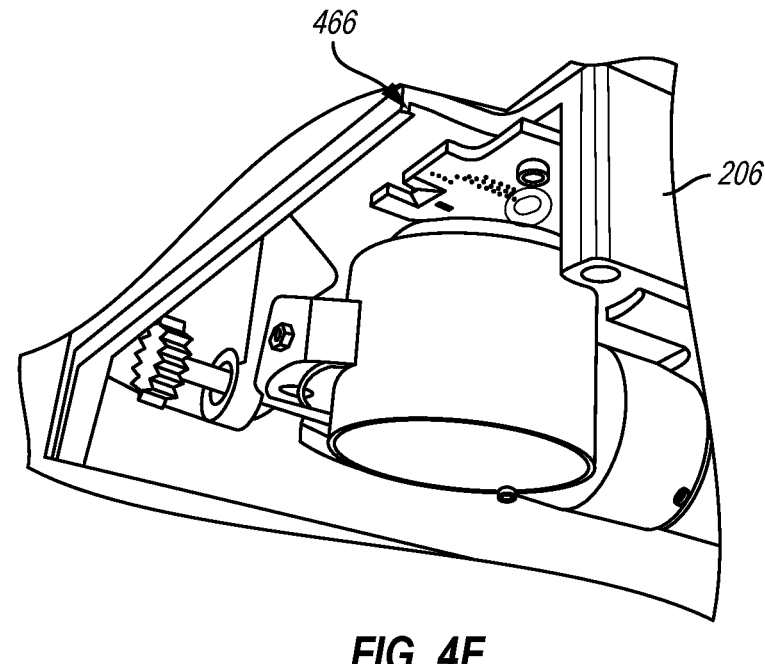
Figure 4G:
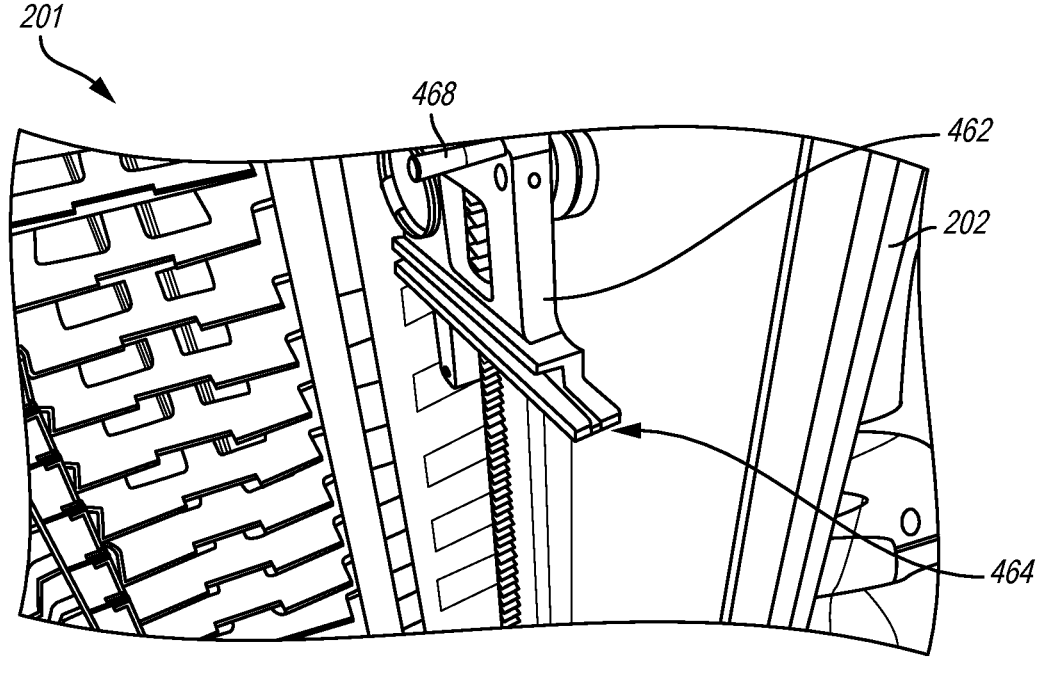

A method for removing the robot from the automated data storage library, according to one embodiment, includes decoupling the robot from guide members 452 of the guidance system 450 mounted in the frame 202 of the automated data storage library. As noted above, this may entail disengagement of one or more fasteners, preferably by manipulating one or more tool-less fasteners. A cable may also be detached from the robot, preferably by disengaging a tool-less coupling. Referring to FIGS. 4D-4E, the robot is moved out of the automated data storage library in a direction perpendicular to a plane of XY movement of the robot within the automated data storage library. As shown, the guide members 452 remain engaged with rails 454 of the guidance system 450 upon removal of the robot 206.

To install a new robot 206, the foregoing process is generally reversed, e.g., such that a different robot is coupled to the guide members 452 of the guidance system 450.

Figure 5:
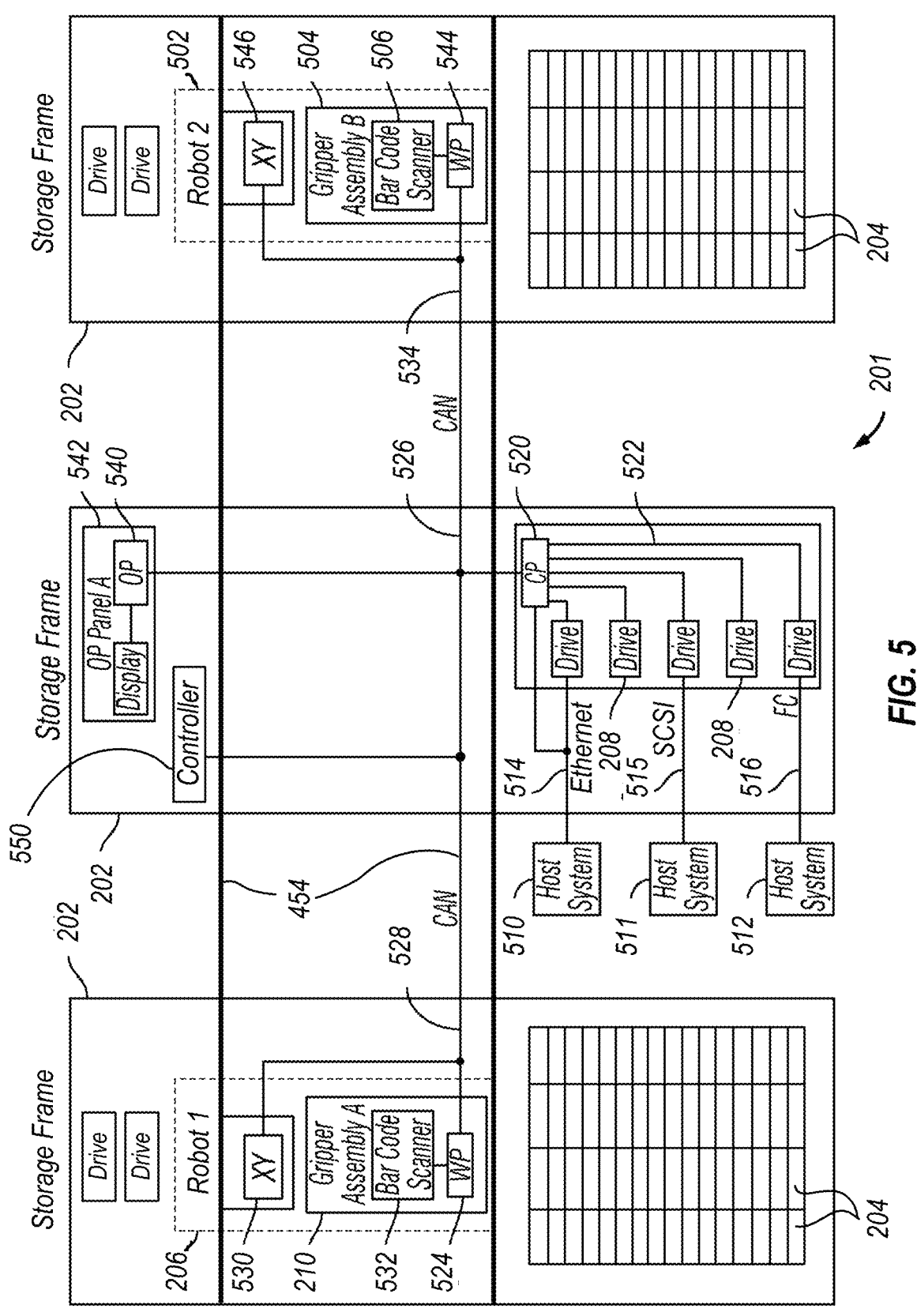
FIG. 5 is a block diagram of an automated data storage library according to one embodiment.

FIG. 5 is a system diagram of an automated data storage library 201, in accordance with one embodiment. As an option, the present automated data storage library 201 may be implemented in conjunction with features from any other embodiment listed herein, such as those described with reference to the other FIGS. Of course, however, such automated data storage library 201 and others presented herein may be used in various applications and/or in permutations which may or may not be specifically described in the illustrative embodiments listed herein. Further, the automated data storage library 201 presented herein may be used in any desired environment. Thus FIG. 5 (and the other FIGS.) should be deemed to include any and all possible permutations.

Referring now to FIG. 5, the automated data storage library 201 has common numbering for common features with the embodiments shown in FIGS. 2-3. A feature of the automated data storage library 201 shown in FIG. 5 include multiple robots 206, e.g., similar to that shown in FIG. 4A, but having a guidance system 450 that runs across several frames 202 to allow the robots 206 to travel horizontally between the frames 202.

According to a preferred approach, the library 201 may employ a controller, e.g., arranged as a distributed system of modules with a plurality of processor nodes.

In one approach, the library is controlled, not by a central controller, but rather, by a distributed control system for receiving logical commands and converting the commands to physical movements of the robot and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 201 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 5, the library 201 may have one or more storage frames 202, three being shown in FIG. 5. The left hand frame 202 is shown with a robot 206, where, as discussed above, the robot 206 may include a gripper assembly 210 and/or a reading system 532 (e.g., bar code scanner, near field communications device, etc.) to "read" identifying information about the data storage media, depending on the desired embodiment. Furthermore, the right hand frame 202 is shown having a second robot 502, which includes a gripper assembly 504 and may also include a reading system 506 to "read" identifying information about the data storage media.

According to one approach, in the event of a failure or other unavailability of the robot 206, or its gripper assembly 210, etc., the second robot 502 may perform some or all of the functions of the robot 206 while the robot 206 is being repaired/replaced. Thus, in different approaches, the two robots 206, 502 may share one or more mechanical paths, they may have completely independent mechanical paths, or combinations thereof. In one example, the robots 206, 502 may travel along a common horizontal rail 454 along a frame or from frame to frame, with independent vertical actuation mechanics to travel vertically.

In an exemplary embodiment which is in no way intended to limit the invention, the first and second robots 206, 502 may preferably move their grippers in at least two directions, called the horizontal "X" direction and vertical "Y" direction, e.g., to retrieve and grip, deliver and release, load and unload, etc. the data storage cartridge at multi-cartridge deep slot cells 204, data storage drives 208, etc.

With continued reference to FIG. 5, library 201 receives commands from one or more host systems 510, 511, 512. The host systems 510, 511, 512, such as host servers, communicate with the library directly, e.g., on path 514, through one or more control ports (not shown), or through one or more data storage drives 208 on paths 515, 516. Thus, in different approaches, the host systems 510, 511, 512 may provide commands to access particular data storage cartridges and move the cartridges, for example, between the storage cells 204 and the data storage drives 208. The commands are typically logical commands identifying the cartridges or cartridge media, and/or logical locations for accessing the media. Furthermore, it should be noted that the terms "commands" and "work requests" are used interchangeably herein to refer to such communications from the host system 510, 511, 512 to the library 201 as are intended to result in accessing particular data storage media within the library 201, depending on the desired approach.

According to one embodiment, the library 201 may be controlled by a library controller 550. Moreover, in various approaches, the library controller may include or be a distributed control system receiving the logical commands from hosts, determining the required actions, and/or converting the actions to physical movements of the robots 206, 502. In another approach, the distributed control system may have a plurality of processor nodes, each having one or more computer processors. According to one example of a distributed control system, a communication processor node 520 may be located in a storage frame 202. The communication processor node provides a communication link for receiving the host commands, either directly or through the drives 208, via at least one external interface, e.g., coupled to line 514.

Still referring to FIG. 5, the communication processor node 520 may additionally provide a communication link 522 for communicating with the data storage drives 208. As illustrated, the communication processor node 520 may preferably be located in the storage frame 202, e.g., close to the data storage drives 208. Furthermore, one or more additional work processor nodes may be provided to form an exemplary distributed processor system, which may comprise, e.g., a work processor node 524 located at robot 206, and that is coupled to the communication processor node 520 via a network 526, 528. According to different approaches, each work processor node may respond to received commands that are broadcast thereto from any communication processor node, and the work processor nodes may also direct the operation of the robots, e.g., providing move commands. An XY processor node 530 may be provided and may be located at an XY system of robot 206. As illustrated, the XY processor node 530 is coupled to the network 526, 528, and is responsive to the move commands, operating the XY system to position the gripper assembly 210.

Also, an operator panel processor node 540 may be provided at the optional operator panel 542 for providing an interface for communicating between the operator panel and the communication processor node 520, the work processor nodes 524, 544, and the XY processor nodes 530, 546.

A network 526, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA®, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 5, the communication processor node 520 is coupled to each of the data storage drives 208 of a storage frame 202, via lines 522, and are thereby communicating with the drives 208 and with host systems 510, 511, 512. Alternatively, the host systems 510, 511, 512 may be directly coupled to the communication processor node 520, at input 514 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 5, host connections 514 and 515 are intended to be Ethernet and a SCSI bus, respectively, e.g., and may serve as host connections. However, bus 516 comprises an example of a Fibre Channel bus which is a high speed serial data interface, allowing transmission over greater distances than the SCSI bus systems.

According to some approaches, the data storage drives 208 may be in close proximity to the communication processor node 520, and may employ a short distance communication scheme, such as Ethernet, or a serial connection, such as RS-422. Thus, the data storage drives 208 may be individually coupled to the communication processor node 520 by lines 522. Alternatively, the data storage drives 208 may be coupled to the communication processor node 520 through one or more networks.

Furthermore, additional storage frames 202 may be provided, whereby each is preferably coupled to the adjacent storage frame. According to various approaches, any of the additional storage frames 202 may include communication processor nodes 520, storage cells 204, data storage drives 208, networks 526, an operator panel 542, etc.

Moreover, as described above, the automated data storage library 201 may comprise a plurality of robots 206. A second robot 502, for example, is shown in the right hand storage frame 202 of FIG. 5. The second robot 502 may include a gripper assembly 504 for accessing the data storage media, and an XY system 546 for moving the second robot 502. The second robot 502 may run on the same horizontal mechanical path as the robot 206, and/or on an adjacent (e.g., separate) path. Moreover, the illustrative control system additionally includes an extension network 534 which forms a network coupled to network 526 of the middle storage frame 202 and to network 528 of the left hand storage frame 202.

According to another approach, network 528 may not be associated with the left hand storage frame and network 534 may not be associated with the right hand storage frame; rather all storage frames may share a common network 526.

Moreover, depending on the design of the library, a service bay (not shown) of conventional design may be provided.

An automated data storage library 201 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 6:
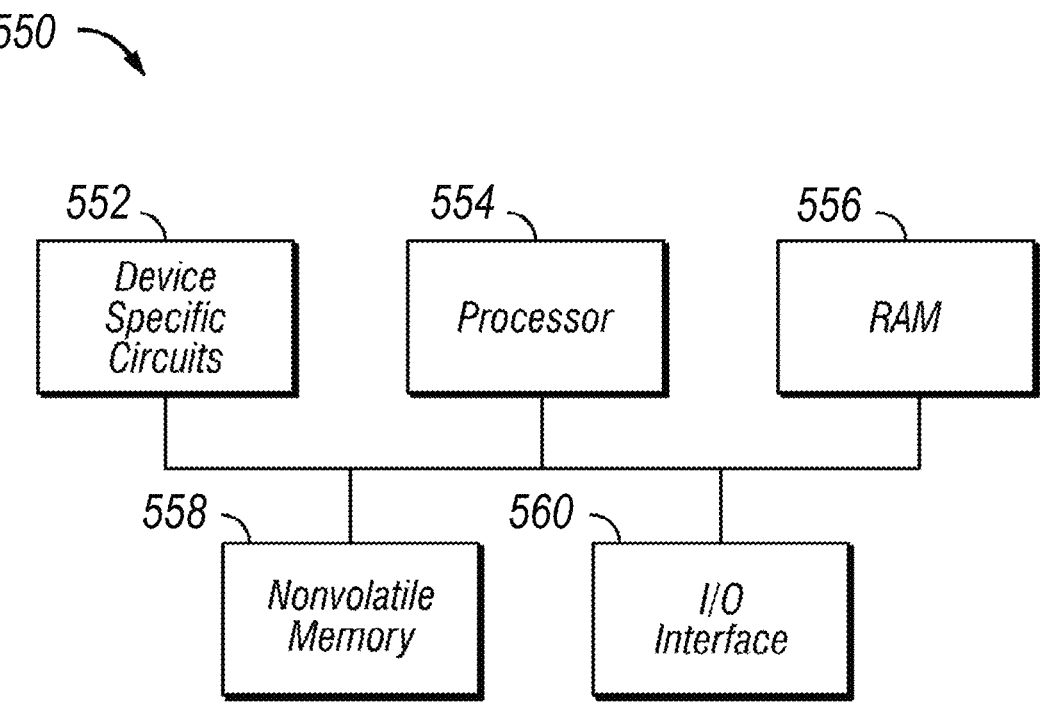
FIG. 6 is a block diagram depicting a controller configuration according to one embodiment.

Referring now to FIG. 6, a typical controller 550 is shown with a processor 554, Random Access Memory (RAM) 556, nonvolatile memory 558, device specific circuits 552, and I/O interface 560. Alternatively, the RAM 556 and/or nonvolatile memory 558 may be contained in the processor 554 as could the device specific circuits 552 and I/O interface 560. The processor 554 may comprise, for example, an off-the-shelf microprocessor, custom processor, Field Programmable Gate Array (FPGA), Application Specific Integrated Circuit (ASIC), discrete logic, etc. The RAM 556 is typically used to hold variable data, stack data, executable instructions, etc.

According to various approaches, the nonvolatile memory 558 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 558 is typically used to hold the executable firmware and any nonvolatile data. Moreover, the I/O interface 560 comprises a communication interface that allows the processor 554 to communicate with devices external to the controller. Examples may comprise, but are not limited to, serial interfaces such as RS-232, USB (Universal Serial Bus) or Small Computer Systems Interface (SCSI). The device specific circuits 552 provide additional hardware to enable the controller 550 to perform unique functions including, but not limited to, motor control of a cartridge gripper. Moreover, the device specific circuits 552 may include electronics that provide, by way of example but not limitation, Pulse Width Modulation (PWM) control, Analog to Digital Conversion (ADC), Digital to Analog Conversion (DAC), etc. In addition, all or part of the device specific circuits 552 may reside outside the controller 550.

While the automated data storage library 201 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 520 (e.g., of FIG. 5) may comprise the library controller while the other processor nodes (if present) may assist the library controller and/or may provide backup or redundant functionality. In another example, communication processor node 520 and work processor node 524 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 7A:
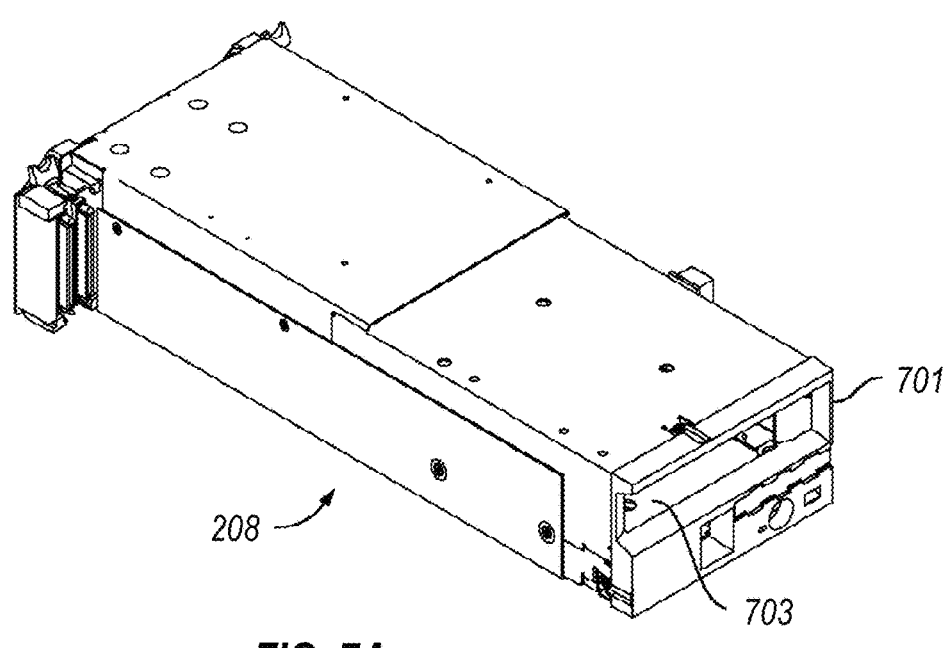
FIG. 7A is a front perspective view of a data storage drive according to one embodiment.
Figure 7B:
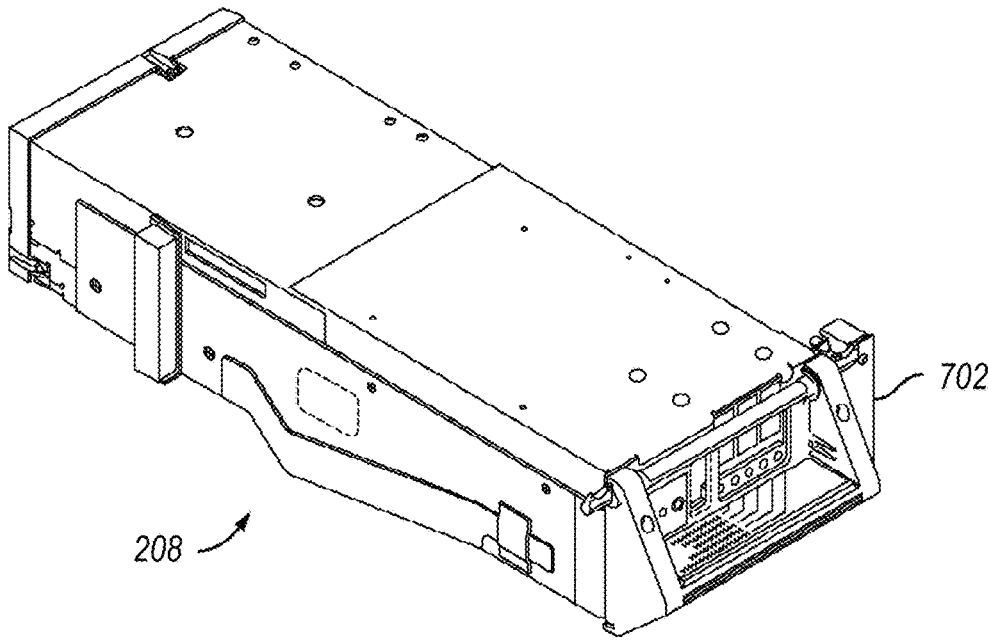
FIG. 7B is a rear perspective view of the data storage drive of FIG. 7A.

FIGS. 7A-7B illustrate the front 701 and rear 702 views of a data storage drive 208, according to one embodiment. In the example depicted in FIGS. 7A-7B, the data storage drive 208 comprises a hot-swap drive canister, which is in no way intended to limit the invention. In fact, any configuration of data storage drive may be used whether or not it includes a hot-swap canister. As discussed above, a data storage drive 208 is used to read and/or write data with respect to the data storage media, and may additionally communicate with a memory which is separate from the media, and is located within the cartridge. Thus, according to one approach, a data storage cartridge may be placed into the data storage drive 208 at opening 703.

Figure 8:
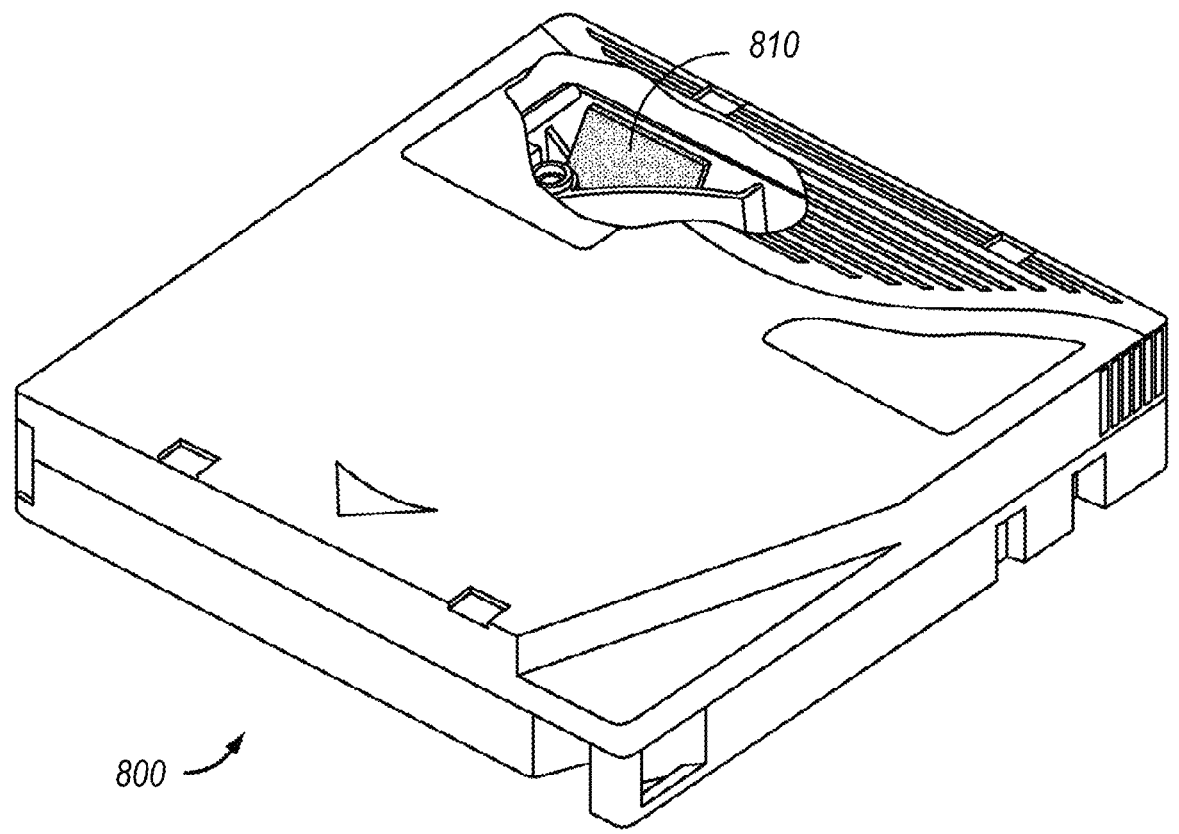
FIG. 8 is perspective view of a data storage cartridge having a cutaway portion, according to one embodiment.

Furthermore, FIG. 8 illustrates an embodiment of a data storage cartridge 800 with a cartridge memory 810 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick®, etc.; etc., or other suitable media. Moreover, an example of a data storage cartridge that is widely employed in automated data storage libraries for mass data storage is a magnetic tape cartridge in which the media is magnetic tape.

Figure 9A:
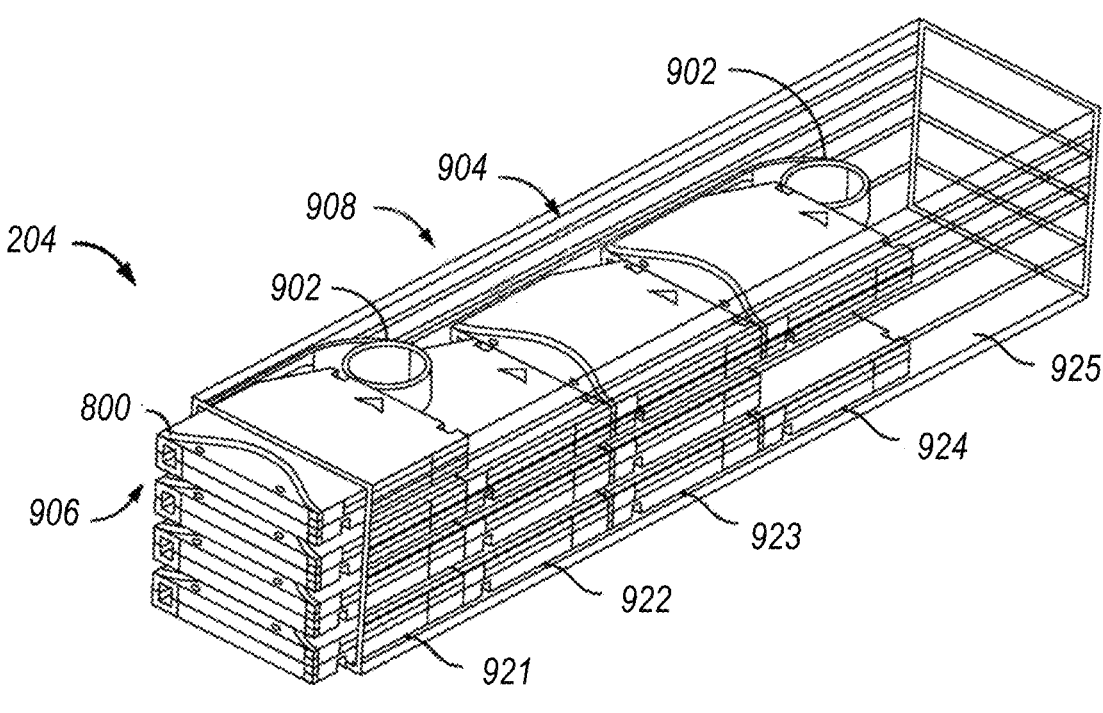
FIGS. 9A-9B are perspective views of a multi-cartridge deep slot cell according to one embodiment.
Figure 9B:
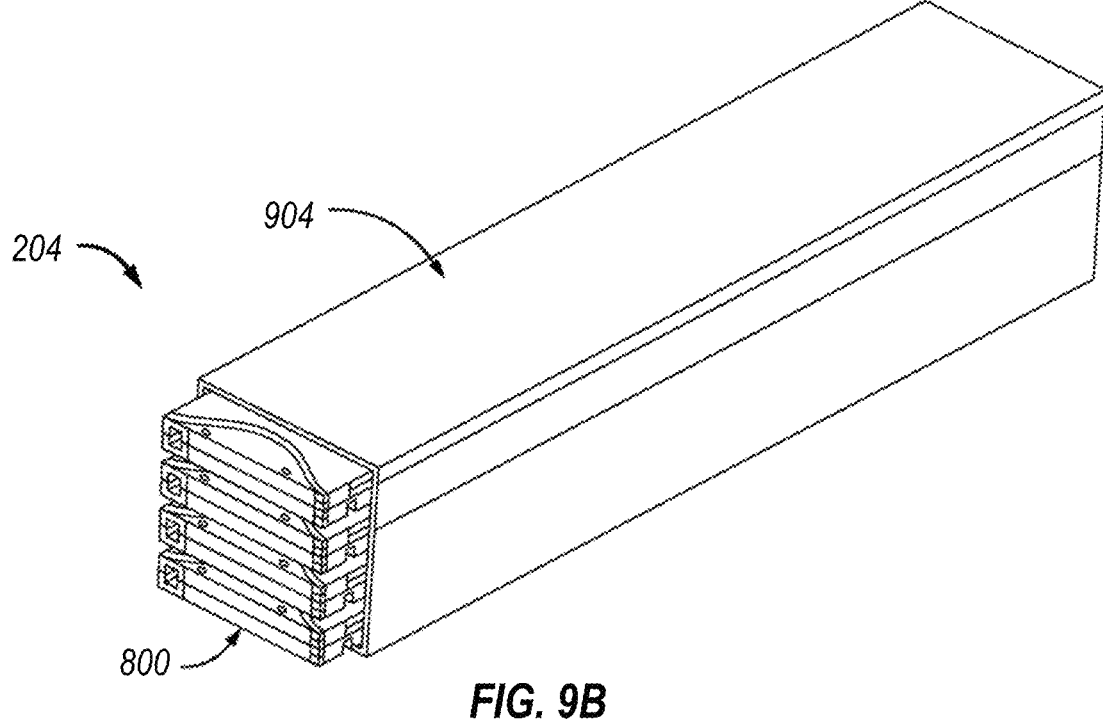

Looking now to FIGS. 9A-9B, a multi-cartridge deep slot cell 204 having biasing springs 902 is depicted according to one embodiment. As shown in the illustrative embodiment, the multi-cartridge deep slot cell 204 comprises a housing 904 defining an interior space 906. Furthermore, a plurality of storage slots 908 is disposed within the housing, and may be configured for storing up to a plurality of data storage cartridges 800, depending on the desired approach. Alternatively, the multi-cartridge deep slot cell 204 may be built into the frame of the automated data storage library according to one approach.

FIGS. 10A-10D illustrate an embodiment of a cartridge blocking mechanism 1000 having a retaining gate 1002 that retains the data storage cartridges in the multi-cartridge deep slot cell 204 according to one embodiment. As illustrated, according to one approach, the retaining gate 1002 may be externally attached to a multi-cartridge deep slot cell 204, relative to a front opening of the multi-cartridge deep slot cell 204, whereby the retaining gate 1002 can be activated by a robot 206, e.g., of an automated tape library. Moreover, the retaining gate 1002 allows for positive cartridge retention against the pressure of biasing springs (see 902 of FIGS. 9A-9B), and ensures that one or more data storage cartridges do not get pushed out of the multi-cartridge deep slot cell 204 simultaneously, while allowing the pushing mechanism (not shown) of the multi-cartridge deep slot cell 204 to continuously push data storage cartridge(s) to the opening in a multi-cartridge deep slot cell 204. Thus, according to one approach, the robot 206 may open the retaining gate to gain access to the data storage cartridge in tier 1 and, upon its extraction, the biasing spring 902 moves the cartridge(s)

positioned behind the extracted cartridge forward, thereby promoting the cartridge(s) by one tier as will soon become apparent.

Figures 10A, 10B:
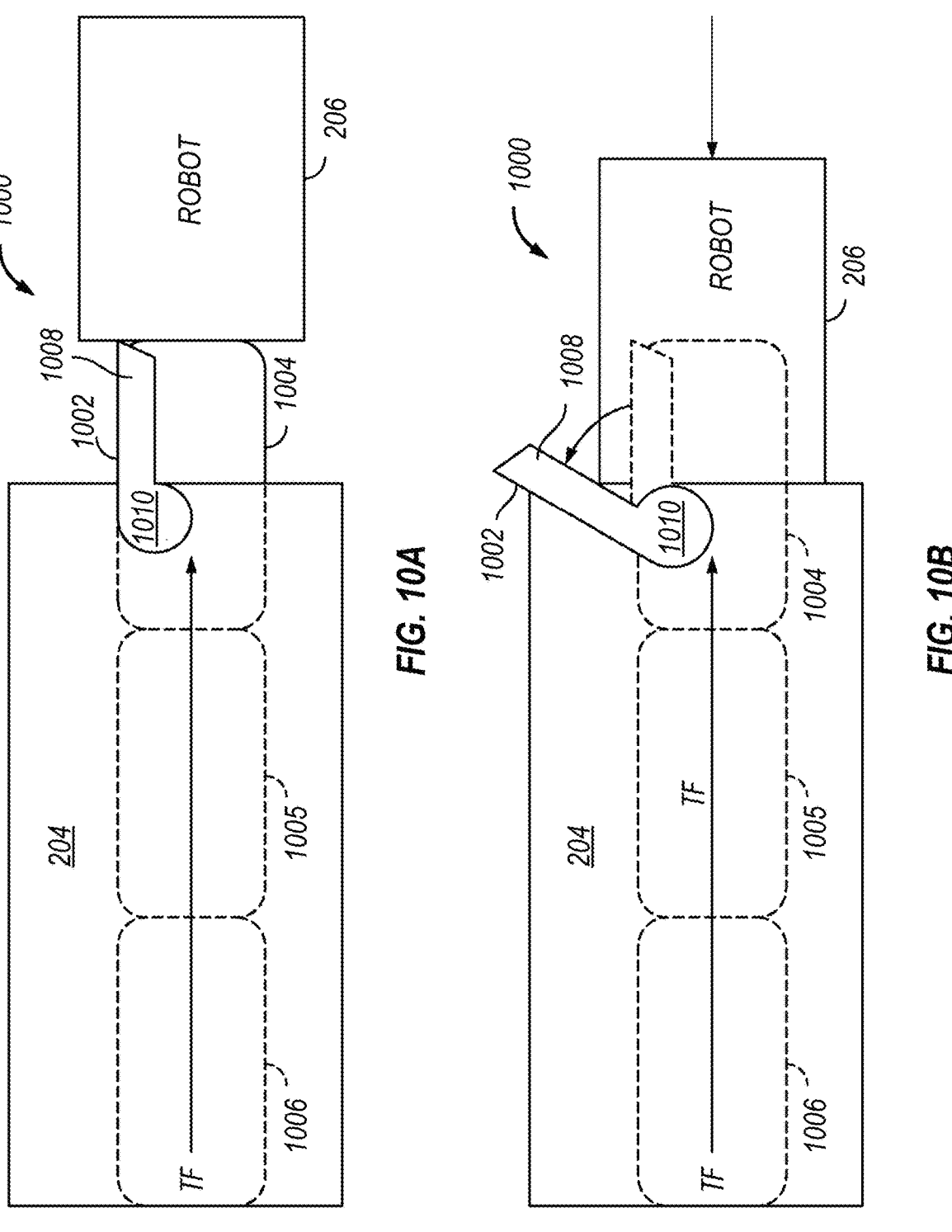
FIGS. 10A-10D are partial side views of a cartridge blocking mechanism according to one embodiment.

The basic working of the retaining gate is that the gate prevents the data storage cartridge(s) from being pushed out of a multi-cartridge deep slot cell 204. For example, as shown in FIGS. 10A-10D, a retaining gate 1002 can be lifted by, for example, robot 206 or by a front storage cartridge 1004 for cartridge removal from/insertion into a multi-cartridge deep slot cell 204. Specifically, retaining gate 1002 has a pivoting arm 1010 mounted on multi-cartridge deep slot cell 204 via a pivoting post (not shown) that can be integral to a construction of multi-cartridge deep slot cell 204. Pivoting arm 1010 is located below a catch 1008 of retaining gate 1002 whereby a thrust force TF through data storage cartridge 1006-1004 caused by the pushing mechanism (not shown) of multi-cartridge deep slot cell 204 causes retaining gate 1002 to stay closed in a retaining position as shown in FIG. 10A. Moreover, the retaining gate 1002 is preferably biased such that it closes in the downward direction over the front opening of multi-cartridge deep slot cell 204. This constant biasing may be achieved via gravity as shown in FIG. 10A or by implementing a spring force, e.g., attached to retaining gate 1002 (not shown).

Figures 10C, 10D:
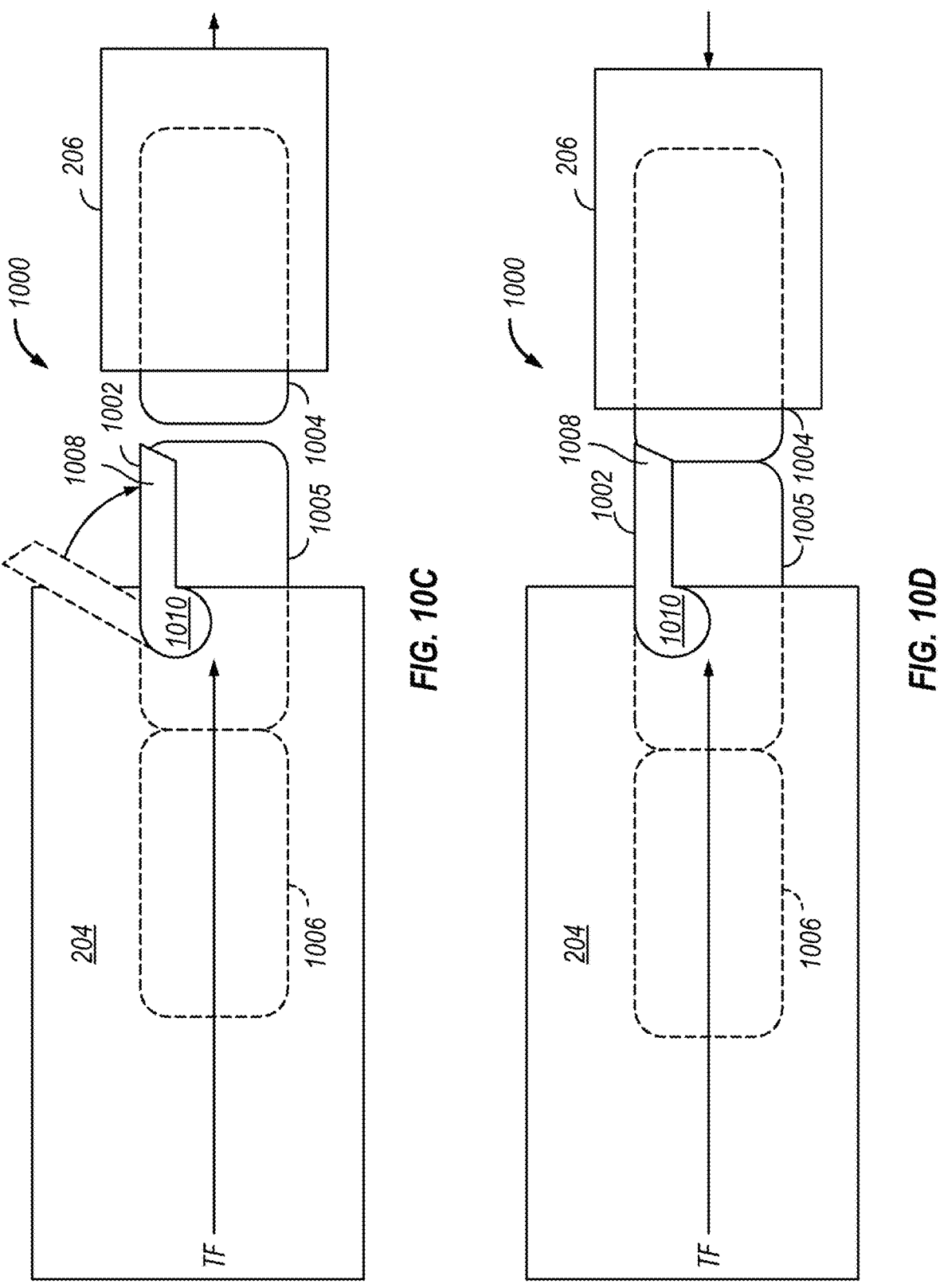

For removal of front storage cartridge 1004 by robot 206 from multi-cartridge deep slot cell 204, retaining gate 1002 must be lifted upward to a releasing position whereby catch 1008 of retaining gate 1002 is disengaged from front storage cartridge 1004. This can be seen in FIG. 10B where robot 206 interfaces with retaining gate 1002 by providing a lifting force. Once retaining gate 1002 is lifted to the releasing position and robot 206 is engaged with storage cartridge 1004, robot 206 can pull storage cartridge 1004 out of multi-cartridge deep slot cell 204 and into robot 206 without any interference of retaining gate 1002 as shown in FIG. 10C. In view of storage cartridges 1006 and 1005 being stored in multi-cartridge deep slot cell 204, retaining gate 1002 must return to its retaining position to prevent storage cartridges 1006 and 1005 from being ejected from multi-cartridge deep slot cell 204 by the thrust force TF of the pushing mechanism (not shown). During extraction of front storage cartridge 1004 through the front opening of multi-cartridge deep slot cell 204, the retaining gate 1002, which is being biased downward, moves back to the retaining position to engage storage cartridge 1005.

Once front storage cartridge 1004 is extracted and storage cartridges 1005 and 1006 are retained from being pushed out of multi-cartridge deep slot cell 204, retaining gate 1002 has successfully completed its cartridge retrieval process. Now retaining gate 1002 demonstrates its ability to work for cartridge insertion into multi-cartridge deep slot cell 204. When robot 206 begins to insert storage cartridge 1004 back into multi-cartridge deep slot cell 204, retaining gate 1002 is lifted to its releasing position to allow storage cartridge 1004 through the front opening of multi-cartridge deep slot cell 204. Catch 1008 of retaining gate 1002 interfaces with a rear portion of storage cartridge 1004, in particular a beveled surface of catch 1008 as shown in FIG. 10D, whereby retaining gate 1002 is lifted to its releasing position as shown in FIG. 10B due to storage cartridge 1004 being pushed in multi-cartridge deep slot cell 204 by robot 206. In doing so, storage cartridges 1006, 1005 are pushed deeper into multi-cartridge deep slot cell 204 by storage cartridge 1004 in multi-cartridge deep slot cell 204 by robot 206. Thus, the robot is able to provide a force greater than the thrust force TF antiparallel thereto, to overcome the directional biasing of the storage cartridges 1006, 1005. Upon full insertion into multi-cartridge deep slot cell 204, retaining gate 1002 moves to its retaining position to engage storage cartridge 1004 as shown in FIG. 10A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 9A-9B, in accordance with one embodiment, storage slots 908 are depicted as being configured for storing up to a plurality of data storage cartridges 800, and arranged in sequential order of tiers 921, 922, 923, 924, 925 from front to rear. It should be noted that the frontmost tier 921 is also called "tier 1", while the next tier 922 is called "tier 2", etc., and the last tier 925 is also called the "rearmost" tier.

Referring again to FIGS. 2-6, according to one embodiment, the controller 550 of automated data storage library 201 may operate the robot (s) 206, 502 to selectively extract, place and/or transport data storage cartridges with respect to the multi-cartridge deep slot cells 204 and/or other elements of the automated data storage library 201. For example, the controller may facilitate extracting a cartridge from a multi-cartridge deep slot cell 204, transporting the cartridge to a data storage drive 208 and placing the cartridge in the drive 208. The controller may then extract the cartridge from the data storage drive 208, while directing the robot to transport the cartridge to a specific multi-cartridge deep slot cell 204, and place the cartridge therein.

In one embodiment, one or more data storage cartridges may be added into the library, e.g., at an I/O station of a type known in the art, whereby the controller of the automated data storage library 201 may then operate the robot(s) 206, 502 to transport the cartridge(s) to specific multi-cartridge deep slot cell(s) 204, and place the cartridge(s) therein. Similarly, the controller may operate the robot(s) to selectively extract, place and transport data storage cartridges with respect to single cartridge storage slots, if present.

Figure 11:
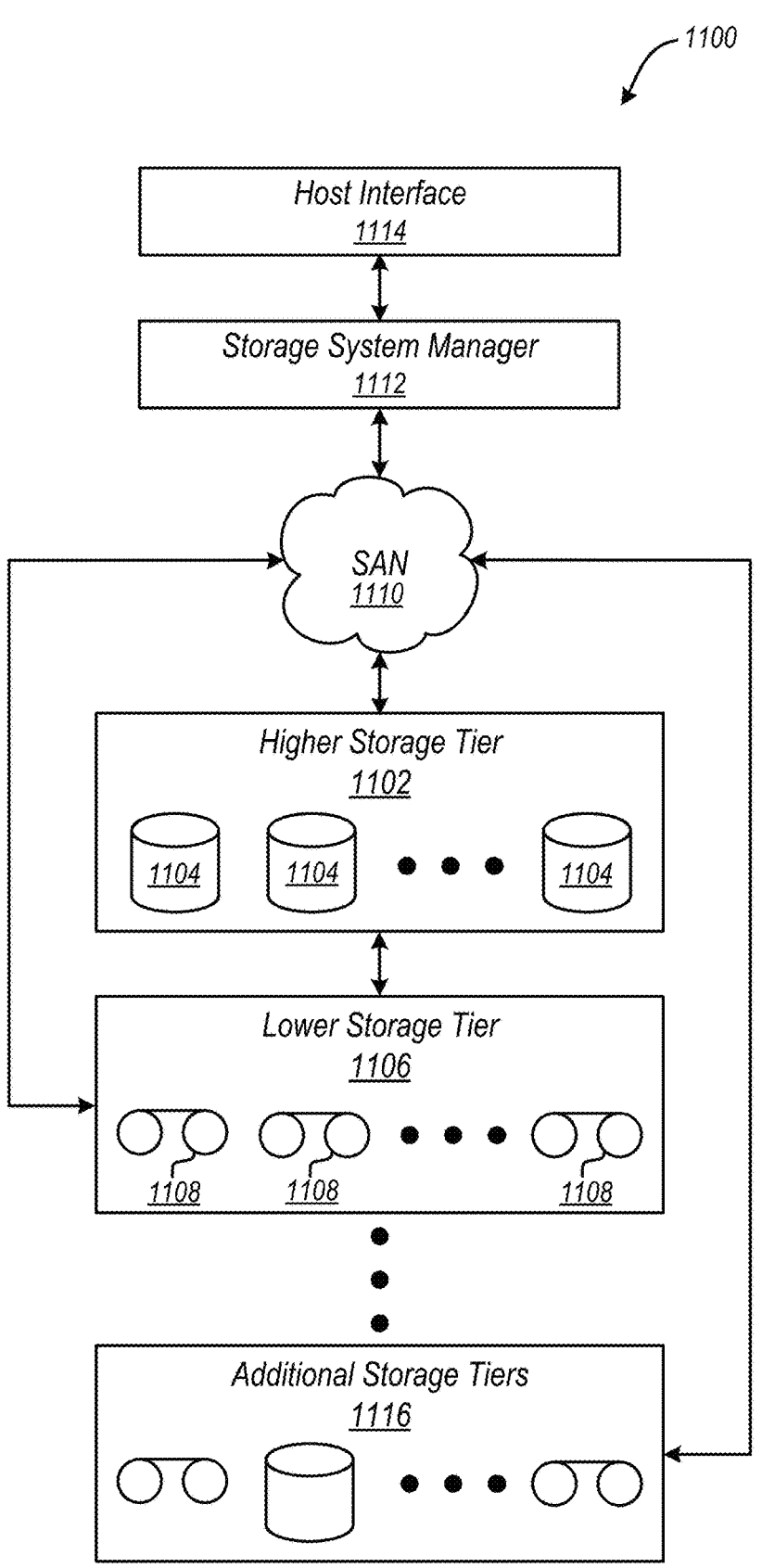
FIG. 11 is a depiction of a tiered data storage system in accordance with one embodiment.

Now referring to FIG. 11, a storage system 1100 is shown according to one embodiment. Note that some of the elements shown in FIG. 11 may be implemented as hardware and/or software, according to various embodiments. In some approaches, the storage system 1100 may be implemented in an automated data storage library such as one of those shown in FIGS. 2-5. In other approaches, an automated data storage library such as such as one of those shown in FIGS. 2-5 may be a tier of the storage system 1100.

The storage system 1100 may include a storage system manager 1112 for communicating with a plurality of media on at least one higher storage tier 1102 and at least one lower storage tier 1106. The higher storage tier(s) 1102 preferably may include one or more random access and/or direct access media 1104, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 1106 may preferably include one or more lower performing storage media 1108, including sequential access media such as magnetic tape in tape drives and/or optical media, slower accessing HDDs, slower accessing SSDs, etc., and/or others noted herein or known in the art. One or more additional storage tiers 1116 may include any combination of storage memory media as desired by a designer of the system 1100. Also, any of the higher storage tiers 1102 and/or the lower storage tiers 1106 may include some combination of storage devices and/or storage media.

The storage system manager 1112 may communicate with the storage media 1104, 1108 on the higher storage tier(s) 1102 and lower storage tier(s) 1106 through a network 1110, such as a storage area network (SAN), as shown in FIG. 11, or some other suitable network type. The storage system manager 1112 may also communicate with one or more host systems (not shown) through a host interface 1114, which may or may not be a part of the storage system manager 1112. The storage system manager 1112 and/or any other component of the storage system 1100 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1100 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 1102, may include a majority of SSD storage media for storing data in a higher performing storage environment, and remaining storage tiers, including lower storage tier 1106 and additional storage tiers 1116 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1102, while data not having one of these attributes may be stored to the additional storage tiers 1116, including lower storage tier 1106. Of course, one of skill in the art, upon reading the present descriptions, may devise many other combinations of storage media types to implement into different storage schemes, according to the embodiments presented herein.

According to some embodiments, the storage system (such as 1100) may include logic configured to receive a request to open a data set, logic configured to determine if the requested data set is stored to a lower storage tier 1106 of a tiered data storage system 1100 in multiple associated portions, logic configured to move each associated portion of the requested data set to a higher storage tier 1102 of the tiered data storage system 1100, and logic configured to assemble the requested data set on the higher storage tier 1102 of the tiered data storage system 1100 from the associated portions. Of course, this logic may be implemented as a method on any device and/or system or as a computer program product, according to various embodiments.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand or even a self-service model enacted by the customer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An apparatus, comprising:
  a guidance system configured for coupling to a frame of an automated data storage library, the guidance system including a guide member coupled to a rail and configured to move along the rail in a first direction; and
  a robot detachably coupled to the guidance system and physically configured to be moved out of the automated data storage library in a direction about perpendicular to a plane of intended movement directions of the robot,
  wherein the guidance system is configured such that the guide member remains engaged with the rail upon detachment of the robot therefrom.

2. An apparatus as recited in claim 1, wherein the robot includes a mechanism for providing movement of a picker mechanism of the robot in a second direction.

3. An apparatus as recited in claim 2, wherein a width of the robot along the second direction is less than a distance between opposing rails of the guidance system.

4. An apparatus as recited in claim 1, wherein the first direction is vertical.

5. An apparatus as recited in claim 1, wherein the first direction is horizontal, wherein the guidance system is configured to extend across multiple frames of the automated data storage library.

6. An apparatus as recited in claim 1, wherein the robot is detachably coupled to the guidance system by only tool-less coupling mechanisms.

7. An apparatus as recited in claim 1, wherein the guidance system includes opposing rails positioned toward opposite sides of the robot, guide members coupled to the rails, and mounts coupled to the guide members, the mounts having an engagement feature for engaging the robot.

8. An apparatus as recited in claim 7, wherein the engagement feature of each mount is a slot for slidably receiving the robot therein.

9. An apparatus as recited in claim 7, wherein each mount includes a retaining feature for selectively coupling the mounts to the rails for preventing movement of the mounts relative to the rails.

10. An apparatus as recited in claim 1, comprising a cable configured for tool-less coupling and decoupling from the robot.

11. An apparatus as recited in claim 1, comprising a bus bar extending along the rail for providing power and/or control signals to the robot.

12. An apparatus as recited in claim 1, further comprising:
  the frame of the automated data storage library; and
  a controller electrically coupled to the frame, the controller being configured to control the robot.

13. A method for removing a robot from an automated data storage library, the method comprising:
  decoupling a robot from guide members of a guidance system mounted in a frame of the automated data storage library; and
  moving the robot out of the automated data storage library in a direction perpendicular to a plane of movement of the robot within the automated data storage library, whereby the guide members remain engaged with rails of the guidance system upon removal of the robot.

14. A method as recited in claim 13, wherein a width of the robot measured along a direction between opposing rails of the guidance system is less than a distance between the rails.

15. A method as recited in claim 13, wherein the guide members are configured to move along the rails in a first direction, wherein the first direction is vertical.

16. A method as recited in claim 13, wherein the guide members are configured to move along the rails in a first direction, wherein the first direction is horizontal, wherein the guidance system is configured to extend across multiple frames of the automated data storage library.

17. A method as recited in claim 13, wherein the guidance system includes mounts coupled to the guide members, the mounts having an engagement feature for engaging the robot; and comprising manipulating retaining features to selectively couple the mounts to the rails for preventing movement of the mounts relative to the rails during removal of the robot.

18. A method as recited in claim 13, comprising manipulating a tool-less fastener for decoupling the robot from the guide members.

19. A method as recited in claim 13, comprising detaching a cable from the robot by disengaging a tool-less coupling.

20. A method as recited in claim 13, comprising coupling a different robot to the guide members.

* * * * *